United States Patent
Kotani

(10) Patent No.: US 7,218,836 B2
(45) Date of Patent: May 15, 2007

(54) PLAYBACK APPARATUS

(75) Inventor: Takuya Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1149 days.

(21) Appl. No.: 10/190,695

(22) Filed: Jul. 9, 2002

(65) Prior Publication Data
US 2003/0021584 A1 Jan. 30, 2003

(30) Foreign Application Priority Data
Jul. 13, 2001 (JP) ............................. 2001-213869

(51) Int. Cl.
H04N 5/76 (2006.01)
H04N 7/00 (2006.01)
(52) U.S. Cl. ......................................... 386/46; 386/95
(58) Field of Classification Search .................. 386/69, 386/70, 94, 95, 125, 126, 46
See application file for complete search history.

(56) References Cited

U.S. PATENT DOCUMENTS

| 4,894,814 A | * | 1/1990 | Yamada et al. | ............... | 369/19 |
| 5,625,461 A | * | 4/1997 | Okamoto et al. | ............. | 386/53 |
| 6,430,355 B1 | * | 8/2002 | Nagasawa | ..................... | 386/52 |

OTHER PUBLICATIONS

U.S. Appl. No. 10/042,324, filed Jan. 11, 2002, Yoshiki Ishii, pending.

* cited by examiner

Primary Examiner—Thai Q. Tran
Assistant Examiner—Nigar Chowdhury
(74) Attorney, Agent, or Firm—Fitzpatrick, Cella, Harper & Scinto

(57) ABSTRACT

A playback apparatus plays back, from a recording medium, a plurality of information files, and a modified file which is generated using a portion of the plurality of information files. If modified data specified in playback description data for specifying a playback procedure for the plurality of information files including the modified file is not recorded on the recording medium, the playback apparatus changes the playback operation for the information files.

2 Claims, 9 Drawing Sheets

```
<video src="clip1.mpg">
    <ks:transitionFilter type="barWipe"subtype="toLeft"dur="3s"/>
</video>
```

FIG. 4

```
<video src="rclip1.mpg".../>
<video src="clip1.mpg"clipBegin="3s".../>
```

FIG. 5

```
<video src="rclip1.mpg"
    rclipFor="transition"effectStart="0s"effectDur="3s"
    efxPrimaryParam="barWipe"efxSecondaryParam="toLeft".../>
<video headShift="3s"src="clip1.mpg"clipBegin="3s".../>
```

FIG. 6

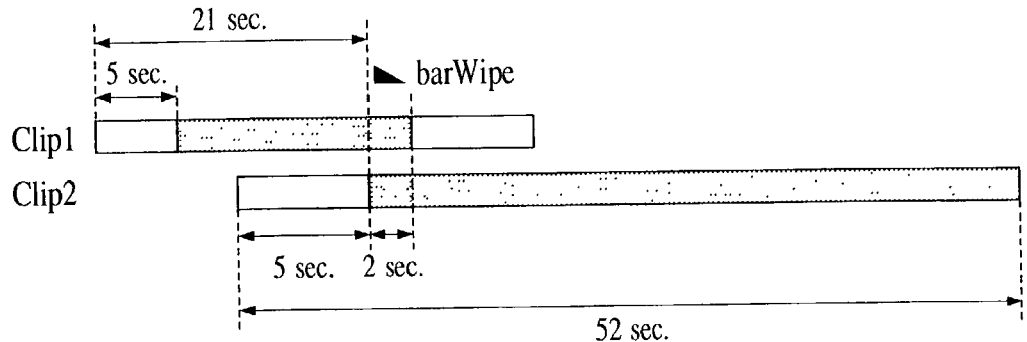
FIG. 7
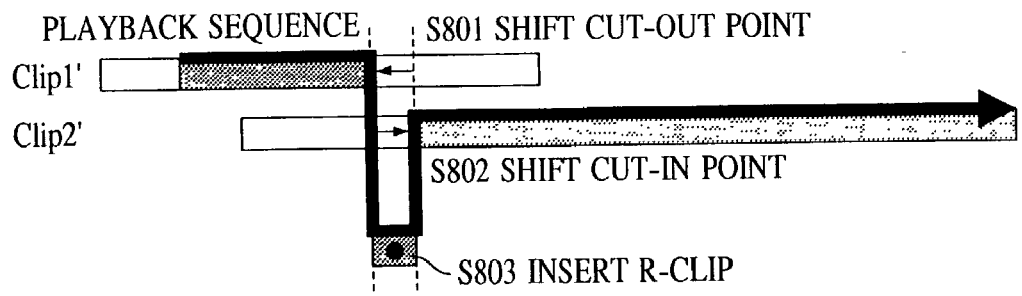
FIG. 8
```
<video src="mov1.mpg"clipBegin="5s"clipEnd="21s"  tailShift="2s"/>
<video src="rclip1.mpg"
    rclipFor="transition"effectStart="0s"effectDur="2s"
    efxPrimaryParam="barWipe"efxSecondaryParam="toLeft".../>
</video>
<video src="mov2.mpg"clipBegin="5s"clipEnd="52s"headShift="2s"/>
```
FIG. 9

```
<smil>
  <head>
  ...
    <transition id="effect1"type="barWipe"dur="1s"/>
  ...
  </head>
  <body>
    <video src="mov1.mpg"tranOut="effect1"/>
    <video src="mov2.mpg"/>
  </body>
</smil>
```

PLAYBACK APPARATUS

BACKGROUND OF THE INVENTION

1. Field of the Invention

The present invention generally relates to a playback apparatus, and more particularly to an apparatus for controlling a playback procedure according to playback description data.

2. Description of the Related Art

With recent digital video players, DVD (digital versatile or video disc) players, etc., digital motion pictures have become familiar to the general public. Also, advances in AV (audio visual) equipment and computer equipment have made it possible to edit motion pictures at home as well as at studios.

FIG. 15 illustrates the relationship of moving image data in a conventional so-called non-linear video editing system. In FIG. 15, moving image data A 1501 and moving image data B 1502 are raw material data which have not been edited, and moving image data C 1503 is newly-generated data which has been edited. In such a conventional non-linear editing system, raw material moving image data are, if necessary, decoded, cut in or cut out along the time axis, rearranged, or have various video effects applied thereto, such as, for example, a wipe between cuts, thereby achieving video rendering, or are re-encoded, if necessary, thereby creating new moving image data.

Conventional systems of this type have disadvantages. In such non-linear editing systems, additional effects, such as video effects, are combined into edited moving image data. Consequently, the additional effects cannot be segregated. Thus, the effect alone cannot be deleted at a later time, or the effect cannot be replaced with another effect. Moreover, even the raw-material image data cannot be identified from the image data having an effect applied thereto.

In another conventional technique, the playback sequence of moving image data or playback effects including video effects are dictated by playback description data which is described in a playback description language known as SMIL (Synchronized Multimedia Integration Language), and the described data is executed by a player, thereby editing a motion picture program without modifying the raw-material moving image data. FIG. 16 shows an example in which a transition effect, which is set between two moving images, is described in SMIL.

In playback description data, a video effect can be described as a playback effect, and can be modified or deleted. However, execution of a particular effect depends upon the playback apparatus. Depending upon the specification of the playback apparatus, a described effect may not be executed. Thus, it is not appropriate that the description of intelligent and complicated video effects and compatibility thereof be defined as the specification of description schemes.

For this reason, a method has been suggested which includes providing, separately from raw-material image data, a modified data object which has been rendered according to a specified effect or the like, and using playback description data to maintain the amount of shift for the cut-in and cut-out points that are shifted because of the addition of the modified data object, so that various effects including video effects can be added or deleted in a completely reversible way.

This method, however, is not without disadvantages. In this method, playback description data and data objects to be played are stored in different files. Consequently, it is possible to delete (erase) data objects or modified data objects necessary for the playback operation according to the playback description data. In particular, during many editing operations, while a file for the playback description data is left, a file for the modified data object specified in the playback description data may be erased unintentionally.

In this case, data cannot be played back according to the procedure specified in the playback description data.

SUMMARY OF THE INVENTION

Accordingly, an object of the present invention is to solve the foregoing problems.

Another object of the present invention is to make it possible to play back data without disruption of the procedure specified in playback description data.

In one aspect of the present invention, a playback apparatus includes a playback means, a detection means, and a control means. The playback means plays back a plurality of pieces of information data from a recording medium. The detection means detects whether or not the information data specified in playback description data is recorded on the recording medium, the playback description data indicating a playback procedure for the plurality of pieces of information data by the playback means. The control means controls a playback operation of the playback means according to a detection result by the detection means.

In another aspect of the present invention, a playback apparatus includes a playback means, a detection means, and a control means. The playback means plays back a plurality of pieces of information data from a recording medium, the plurality of pieces of information data including modified data which is obtained by processing a portion of the information data. The detection means detects whether or not the modified data specified in playback description data is recorded on the recording medium, the playback description data specifying a playback procedure for the plurality of pieces of information data including the modified data. The control means controls a playback operation of the playback means according to the detection result of the detection means.

In yet another aspect of the present invention, a playback apparatus includes a playback means, a detection means, and a control means. The playback means plays back, from a recording medium, a plurality of information data files, each file including information data and a modified data file including modified data which is obtained by processing a portion of the information data according to a preset effect. The detection means detects whether or not the modified data file specified in playback description data is recorded on the recording medium, the playback description data indicating a playback procedure for the information data and the modified data by the playback means.

The control means generates new modified data based on the description content of the playback description data according to a detection result of the detection means and controls the playback means to play back the new modified data according to the playback description data.

In still another aspect of the present invention, a playback apparatus includes a playback means, a detection means, and a control means. The playback means plays back, from a recording medium, a plurality of information data files, each file including information data and a modified data file including modified data which is obtained by processing a portion of the information data according to a preset effect. The detection means detects whether or not the modified data file specified in playback description data is recorded on the recording medium, the playback description data indicating a playback procedure for the information data and the modified data by the playback means. The control means modifies the playback description data according to the detection result of the detection means so that the modified data that is not recorded on the recording medium is not played back and controls a playback operation of the playback means according to the modified playback description data.

In still another aspect of the present invention, a method for playing back a plurality of pieces of information data from a recording medium includes the steps of detecting whether or not the information data specified in playback description data indicating a playback procedure for the information data is recorded on the recording medium and controlling a playback operation for playing back the plurality of pieces of information data according to a detection result of the detecting step.

In still another aspect of the present invention, a method for playing back, from a recording medium, a plurality of information data files, each file including information data and a modified data file including modified data which is obtained by modifying a portion of the information data according to a preset effect includes the steps of: determining whether or not the modified data file specified in playback description data indicating a playback procedure for the information data and the modified data is recorded on the recording medium; generating, if the determination made in the determination step is negative, new modified data according to the description content of the playback description data; and playing back, if the determination made in the determination step is negative, the new modified data according to the playback description data.

In still another aspect of the present invention, a method for playing back, from a recording medium, a plurality of information data files, each file including information data and a modified data file including modified data which is obtained by modifying a portion of the information data according to a preset effect, includes the steps of: determining whether or not the modified data file specified in playback description data indicating a playback procedure for the information data and the modified data is recorded on the recording medium; modifying, if the determination made in the determination step is negative, the playback description data so that the modified data that is not recorded on the recording medium is not played back; and controlling, if the determination made in the determination step is negative, a playback operation according to the modified playback description data.

Further objects, features and advantages of the present invention will become apparent from the following description of the preferred embodiments with reference to the attached drawings.

BRIEF DESCRIPTION OF THE DRAWINGS

FIG. 4 is a view showing example playback description data.

FIG. 5 is a view showing example playback description data.

FIG. 6 is a view showing example playback description data.

FIG. 7 is a view showing a playback operation using a rendering clip.

FIG. 8 is a view which describes a procedure for generating playback description data using a rendering clip.

FIG. 9 is a view showing example playback description data.

DESCRIPTION OF THE PREFERRED EMBODIMENTS

Embodiments of the present invention are now described with reference to the accompanying drawings.

A camcorder for recording and playing back image data or audio data onto and from a magneto-optical disk according to a first embodiment of the present invention is now described.

Figure 1:
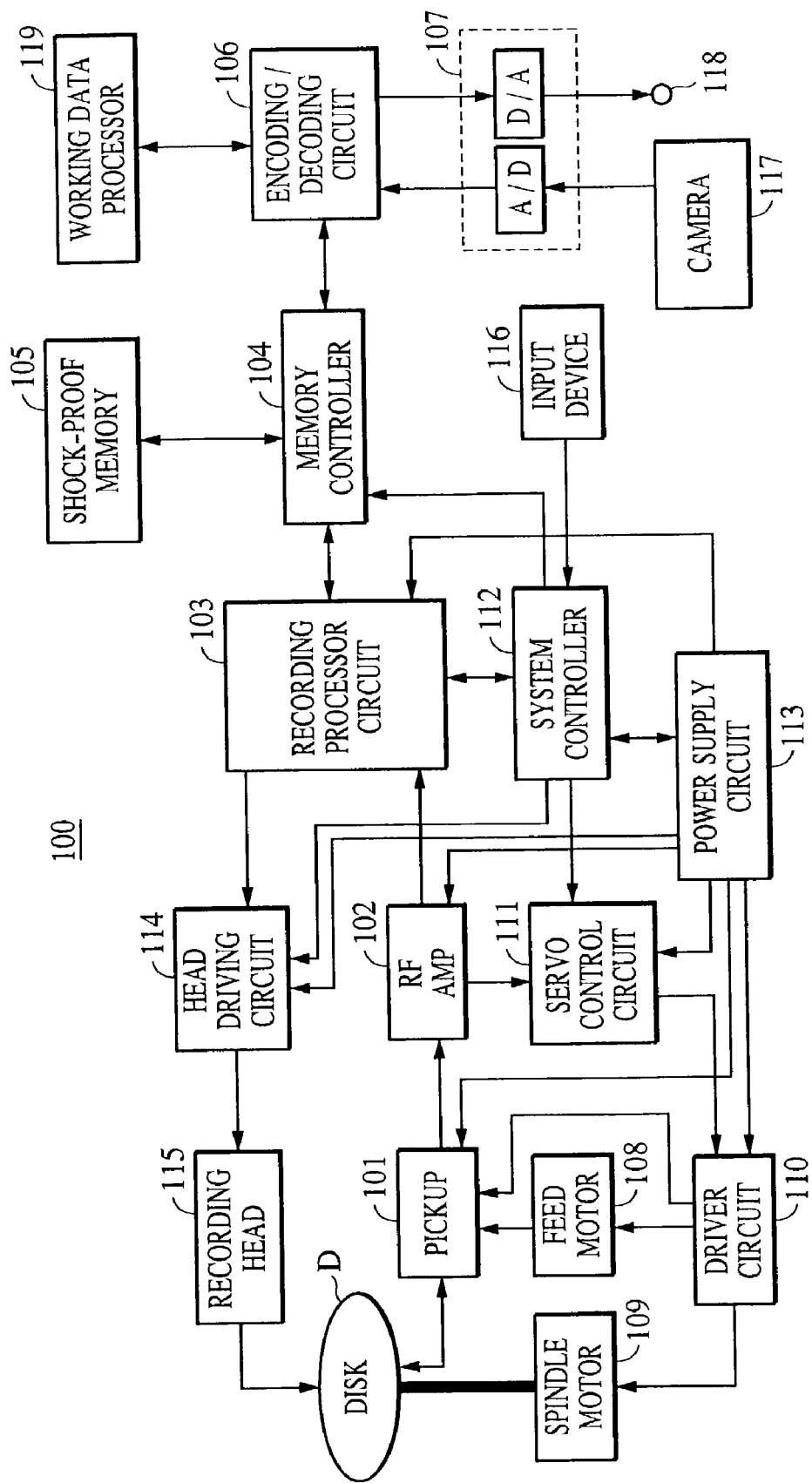
FIG. 1 is a block diagram of a recording and playback apparatus according to the present invention.

FIG. 1 is a block diagram of a camcorder 100 according to the present invention. In FIG. 1, the camcorder 100 includes a pickup unit 101 for writing and reading media data, such as moving images, still images, or audio, to and from a disk D; an RF amplifier 102 for amplifying a read signal; a recording processor circuit 103 which detects various data in response to playback signals during playback and which converts a signal to be recorded into recording-format data during recording; a memory controller 104; a shock-proof memory 105 for temporarily storing data; an encoding/decoding circuit 106 for encoding and decoding image data; and an interface (I/F) 107 having circuits such as a D/A (digital-to-analog) converter and an A/D (analog-to-digital) converter.

The camcorder 100 further includes a feed motor 108 for feeding the pickup unit 101 in the radial direction of the disk D, a spindle motor 109, a driver circuit 110 for driving the feed motor 108 and the spindle motor 109, a servo control circuit 111 for tracking or other control based on a playback signal from the RF amplifier 102, a system controller 112, a power supply circuit 113, a recording head 115, a head driving circuit 114 for controlling the recording head 115 during recording, an input device 116 having various keys, a camera 117, a video/audio output unit 118, and a modified data processor 119 for generating modified data. For example, herein, the disk D is a magneto-optical disk.

An outline of normal recording and playback operation of the camcorder 100 shown in FIG. 1 is now described.

During recording, a moving image signal output from the camera 117 is converted into digital data by the I/F 107, and is then output to the encoding/decoding circuit 106. The encoding/decoding circuit 106 encodes the moving image data to compress the amount of information, and outputs the encoded data to the memory controller 104. The memory controller 104 stores the encoded image data into the memory 105 and reads out the image data at an appropriate timing to the recording processor circuit 103. The MPEG-2 protocol is used for the encoding method according to the first embodiment. However, it is to be understood that other encoding protocols may be used.

The recording processor circuit 103 converts the data read from the memory 105 into data in a form suitable for recording, for example, by adding thereto additional information specified by the format, and outputs the converted data to the head driving circuit 114. The head driving circuit 114 drives the recording head 115 according to a signal from the recording processor circuit 103, and records the data onto the disk D.

In the first embodiment, the data is recorded in the form of a file, and, in particular, a series of moving image and audio data for a period from an instruction to start recording to an instruction to finish are grouped into one file.

The playback operation is now described.

A file to be played back is specified by the input device 116. In response to an instruction for playback, the system controller 112 controls the servo circuit 111 to drive the disk D to start playing back the data.

The pickup unit 101 plays back the data on the disk D, and outputs the data to the recording processor circuit 103 via the RF amplifier 102. The recording processor circuit 103 detects original moving image or audio data from the played data, and outputs the detected data to the memory controller 104, while outputting various additional data to the system controller 112.

The memory controller 104 temporarily stores the played data in the memory 105, and reads it out at an appropriate timing to the encoding/decoding circuit 106. The encoding/decoding circuit 106 decodes the played data, and outputs the decoded data to an external device such as a monitor via the I/F 107 from the output unit 118.

Playback description data according to the first embodiment is now described.

As used herein, the playback description data is data having described therein playback control information for controlling a procedure for playing back multimedia data such as moving images, still images, audio, and text. The playback description data used in the first embodiment is described in, for example, SMIL 2.0. SMIL 2.0 is an XML (extensible Markup Language) based language specified by the W3C (World Wide Web Consortium), and playback control information for multimedia data can be described in SMIL 2.0. The data to be played back is referred to as a "media object" in SMIL 2.0, and is herein referred to as a "clip". However, it is to be understood that other languages may be used.

In the apparatus shown in FIG. 1, the system controller 112 generates playback description data according to an instruction from the input device 116 in an editing mode, as described below. The generated playback description data is output to the recording processor circuit 103, and is recorded onto the disk D as a separate single file from the files for the moving image and audio data. During playback, the playback description data recorded on the disk D is read, and is temporarily stored in an internal memory of the system controller 112. The content of the playback description data specified by the input device 116 is checked to control the playback operation of the disk D according to the playback description data.

In a moving image editing application using such playback description data, a transition effect portion or a playback effect portion may sometimes be rendered in advance. If this functionality is implemented in SMIL 2.0, it is contemplated that the rendered portion is created as new moving image data (rendering clip; hereinafter referred to as R-clip), which is recorded as an independent file.

Figure 2:
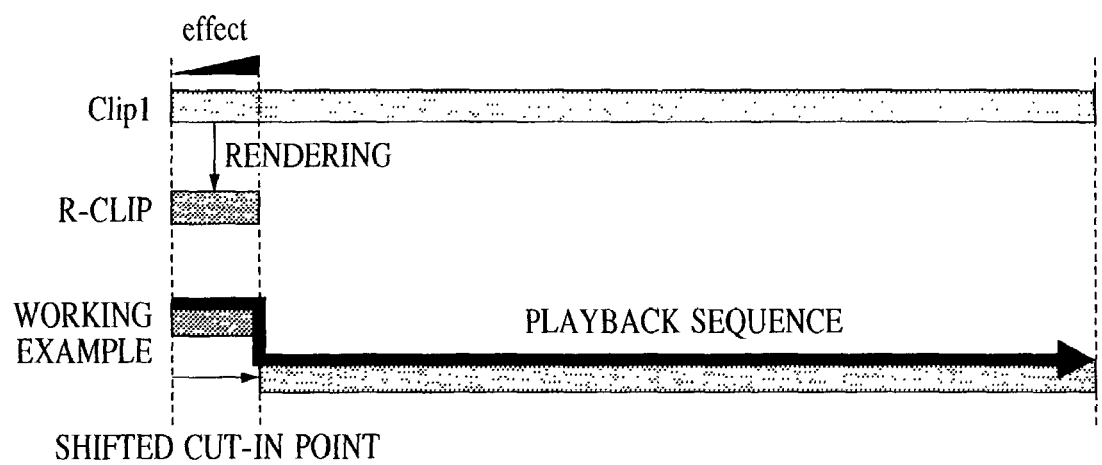
FIG. 2 is a view showing a playback operation using a rendering clip.

FIG. 2 shows the playback procedure using an R-clip.

Figure 3:
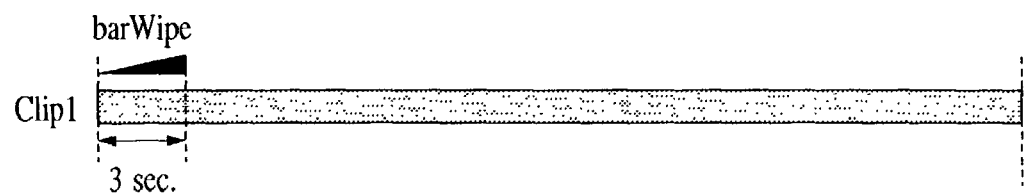
FIG. 3 is a view showing a playback operation for image data to which a special effect is applied.

In the example shown in FIG. 2, where an effect is applied at the beginning of Clip 1, the effect portion is first rendered to create an R-clip, and the cut-in point of Clip 1 is shifted by a period corresponding to the playback time for the R-clip. For example, as shown in FIG. 3, a wipe is applied for three seconds at the beginning of Clip 1. FIG. 4 shows a specific example in which this playback operation is described according to SMIL 2.0 without the R-clip.

FIG. 5 shows an example in which the rendered transition effect portion described in the manner shown in FIG. 4 is described in standard SMIL 2.0. The description shown in FIG. 5 makes it possible to play back a moving image which has been rendered. In FIG. 5, clipBegin="3s" is added to moving image data "clip1.mpg" because the playback starting position of the moving image data "clip1.mpg" is shifted by three seconds due to insertion of the R-clip.

Accordingly, since the identification information of the R-clip or the amount of shift for the cut-in point is not maintained in standard SMIL 2.0, it is not possible to cancel the R-clip, that is, to return to the state shown in FIG. 4. In other words, the effect applied thereto cannot be cancelled out. When the playback description data is described in standard SMIL 2.0, the R-clip cannot be differentiated from a normal clip. In the first embodiment, therefore, the following extensions are added to the SMIL 2.0 specification.

A description is first given of five attributes to be added to the R-clip.

1. rclipFor Attribute

An rclipFor attribute describes an application of the R-clip. The attribute having an attribute value of "transition" indicates that a transition effect is applied to create the R-clip. The attribute having an attribute value of "filter" indicates that a playback effect such as sepia is applied to create the R-clip. The attribute having an attribute value of "title" indicates that a composite letter such as a title letter is applied to create the R-clip. The attribute having an attribute value of "imgBlend" indicates that a combination with a different image at a specified transparency is applied to create the R-clip. The attribute having an attribute value of "imgTrans" indicates that a combination with a different image at a specified transparent color is applied to create the R-clip.

2. effectStart Attribute

If an effect is applied only to a portion of the R-clip, an effectStart attribute is used to specify the time from the beginning of the R-clip to the effect portion. This attribute may be omitted. If omitted, this is equivalent to the attribute in which "0s" is specified.

3. effectDur Attribute

An effectDur attribute is used in combination with the effectStart attribute to specify the duration of an effect. The effectDur attribute may be omitted. If omitted, this is equivalent to the attribute in which the end of the R-clip is specified.

4. efxPrimaryParam Attribute

An efxPrimaryParam attribute value indicates an attribute for maintaining a parameter of a rendering effect, and differs in content depending upon the attribute value of the rclipFor attribute.

(a) If rclipFor="transition", then, a "type" attribute value of a transitionFilter element or a transition element indicating the type of transition effect is stored. In this case, the efxPrimaryParam attribute may be omitted. If omitted, the processing complies with the specification of SMIL 2.0.
(b) If rclipFor="filter", then, the name of the playback effect is stored.
(c) If rclipFor="title", then, a composite text character string is stored.
(d) If rclipFor="imgTrans" or if rclipFor="imgBlend", then, the file name of the combined image is stored.

5. efxSecondaryParam Attribute

An efxSecondaryParam attribute value indicates an attribute for maintaining a parameter of a rendering effect, and differs in content depending upon the attribute value of the rclipFor attribute.
(a) If rclipFor="transition", then, a "subtype" attribute value of a transitionFilter element or a transition element indicating the subtype of transition effect is stored. In this case, the efxSecondaryParam attribute may be omitted. If omitted, the processing complies with the specification of SMIL 2.0.
(b) If rclipFor="filter", then, the parameter of the playback effect is stored.
(c) If rclipFor="title", then, the font name and font size of the composite text character string are stored.
(d) If rclipFor="imgTrans", then, the name of a color specified as a transparent color is stored. The method for specifying a color name complies with the specification of SMIL 2.0.
(e) If rclipFor="imgBlend", then, the degree of transparency for the combined image is stored.

A description is now given of attributes of a clip, whose cut-in and cut-out points are shifted because of the creation and insertion of the R-clip, for maintaining the amount of shift for the cut-in and cut-out points.

1. headShift Attribute

A headShift attribute is an attribute for maintaining the amount of shift for the cut-in point which is shifted because the R-clip is inserted. Due to its nature, this attribute is only set for a clip that is played back immediately after the R-clip.

2. tailShift Attribute

A tailShift attribute is an attribute for maintaining the amount of shift for the cut-out point which is shifted because the R-clip is inserted. Due to its nature, this attribute is only set for a clip that is played back immediately before the R-clip.

Such extensions are used to add information for identifying a rendered modified clip, parameters indicating the kind, duration, etc., of rendering effects, and information for maintaining the amount of shift for the cut-in and cut-out points because of addition of the modified clip. FIG. 6 shows an example in which the example shown in FIG. 4 is described using attributes.

The cut-in point which is shifted because of insertion of the R-clip can be restored using the headShift attribute. The kind or parameter of the originally applied effect can be completely retrieved from the attribute added to the R-clip.

The extensions allow a function which cannot be implemented according to standard SMIL 2.0 to be added, and allow effects to be added or deleted in a completely reversible way.

For example, as shown in FIG. 7, if a transition effect is applied between two clips, i.e., Clip 1 and Clip 2, a procedure for adding an R-clip is performed by the system controller 112 in the manner shown in FIG. 8. This procedure is divided into three steps, that is, steps S801, S802, and S803, and these steps may be performed in any order.

According to the first embodiment, for example, the procedure is performed in the order of steps S801, S802, and S803.

The editing mode is set for the input device 116 (shown in FIG. 1) to instruct the playback procedure shown in FIG. 7. More specifically, an instruction is entered to start the playback operation five seconds after the beginning of Clip 1, continuing it for 21 seconds from the beginning thereof, and subsequently perform the playback operation five seconds from the beginning of Clip 2, continuing it for 52 seconds from the beginning thereof, while adding a transition effect between the last two seconds of Clip 1 and the first two seconds of Clip 2.

In response, in step S801, the system controller 112 shifts the cut-out point of Clip 1 to subtract the amount of shift for the cut-out point from the playback duration of Clip 1. A version of Clip 1 whose cut-out point has been shifted is referred to as Clip 1'. In step S802, the cut-in point of Clip 2 is shifted, and the amount of shift for the cut-in point is subtracted from the playback duration of Clip 2. A version of Clip 2 whose cut-in point has been shifted is referred to as Clip 2'. In step S803, finally, an R-clip is inserted. The parameter of the rendering effect is applied as an attribute of the R-clip, which is then maintained. The resulting playback description data is shown in FIG. 9.

The system controller 112 controls the modified data processor 119, in parallel with the processing for playback description data, to generate an R-clip. That is, in response to the editing instruction described above, the system controller 112 plays back the specified data, namely, data including the transition duration of Clip 1 and data including the transition duration of Clip 2, from the disk D, and stores the data in the memory 105. The playback data is read from the memory 105 at an appropriate time, and is output to the encoding/decoding circuit 106. The decoded data is output to the modified data processor 119.

The modified data processor 119, which has an internal memory, applies a specified transition effect to a specified portion of the played data, and outputs the resulting data to the encoding/decoding circuit 106. The encoding/decoding circuit 106 encodes again the data from the modified data processor 119, and outputs it to the memory controller 104. The memory controller 104 temporarily stores the output data in the memory 105, and outputs it to the recording processor circuit 103 at an appropriate timing.

The recording processor circuit 103 adds identification information indicating an R-clip to the file header of the modified data, and outputs the resulting data to the head driving circuit 114, where the data is recorded as an independent file of the R-clip onto the disk D.

The time required for processing modified data varies depending upon the processor power, particularly when moving image data is processed. Further, the modified data processor 119 in a portable device, such as the camcorder 100 in the first embodiment, has less processing power than a general-purpose personal computer due to a variety of factors, including the circuit size and power consumption. However, the R-clip need not be generated in real time. Thus, this difference in processing power does not cause a problem.

A procedure for erasing the R-clip from the disk D is now described.

Figure 10:
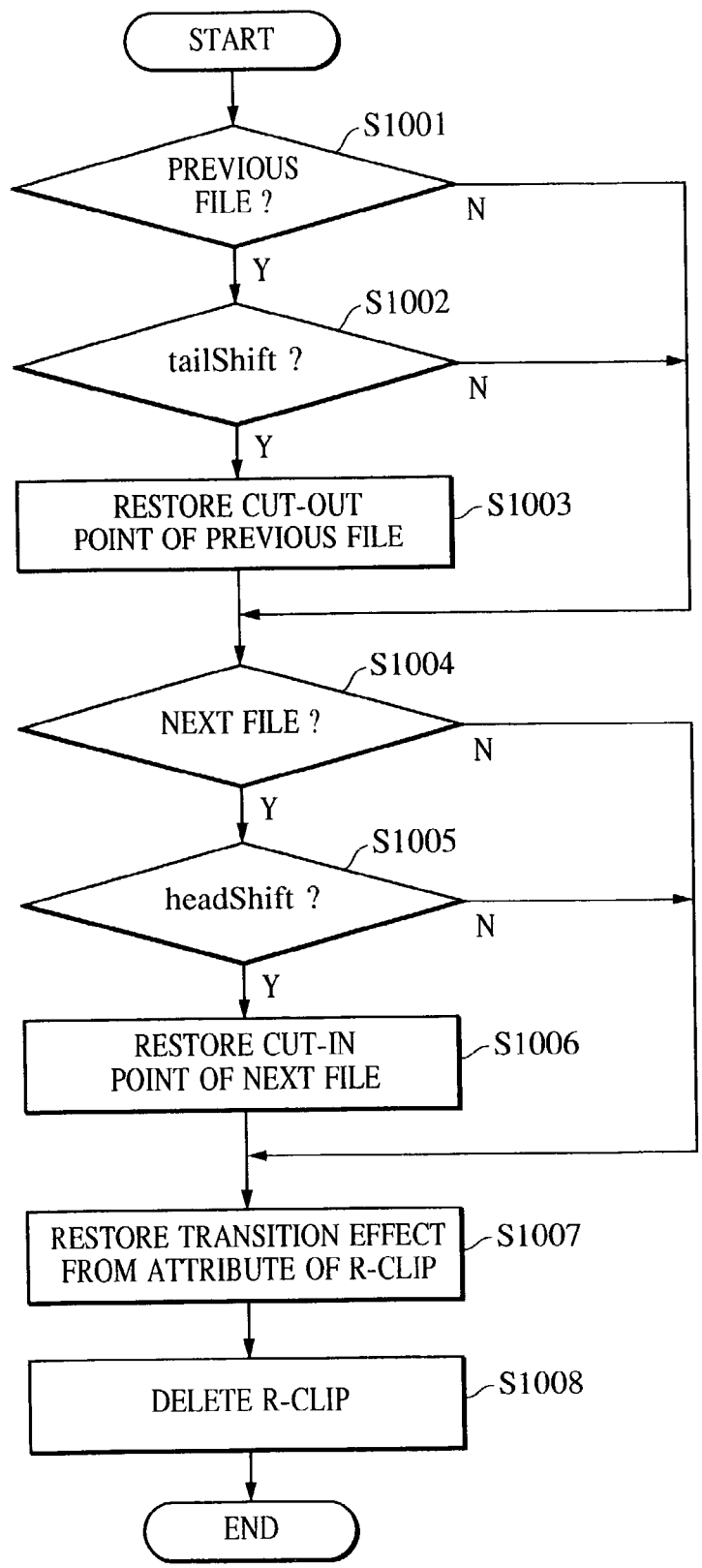
FIG. 10 is a flowchart showing a procedure for modifying playback description data when a rendering clip is erased.

FIG. 10 is a flowchart showing a procedure for deleting the R-clip.

In the editing mode, in response to an instruction to delete the R-clip from the input device 116, it is determined whether or not there is a clip α (a previous file) preceding the R-clip to be deleted (step S1001). If the clip α is present, it is further determined whether or not the tailShift attribute is present (step S1002). If the tailShift attribute is present, the tailShift attribute value is added to the clipEnd and dur attribute values of the clip α. Thus, the cut-out point that has been shifted because of insertion of the R-clip is restored (step S1003).

It is then determined whether or not there is a clip β (a next file) following the R-clip to be deleted (step S1004). If the clip β is present, it is further determined whether or not the headShift attribute is present (step S1005). If the headShift attribute is present, the headShift attribute value is subtracted from the clipBegin and dur attribute values of the clip β. Thus, the cut-in point that has been shifted because of insertion of the R-clip is restored (step S1006).

Then, the attribute values of the R-clip are used to restore the effect applied to the clip α or clip β (step S1007). Finally, the R-clip is deleted from the disk D (step S1008).

The system controller 112 modifies the description of the playback description data because the R-clip has been erased, and then outputs the modified playback description data to the recording processor circuit 103 to delete the original playback description data recorded on the disk D to record the modified playback description data onto the disk D.

The above-described deletion process allows the R-clip which is generated because of addition of the transition effect and which is recorded on the disk D to be deleted to return to the state in which a video effect has not been rendered. Such a method for adding and deleting the R-clip enables an effect to be added and/or deleted in a completely reversible way wherever the effect is applied in a clip.

A procedure when the R-clip specified in the playback description data is not recorded on the disk D is now described.

In the first embodiment, the playback description data contains parameters of the R-clip including the kind, type, subtype, and duration of effects. In this case, the R-clip can be restored according to the following process.

Figure 11:
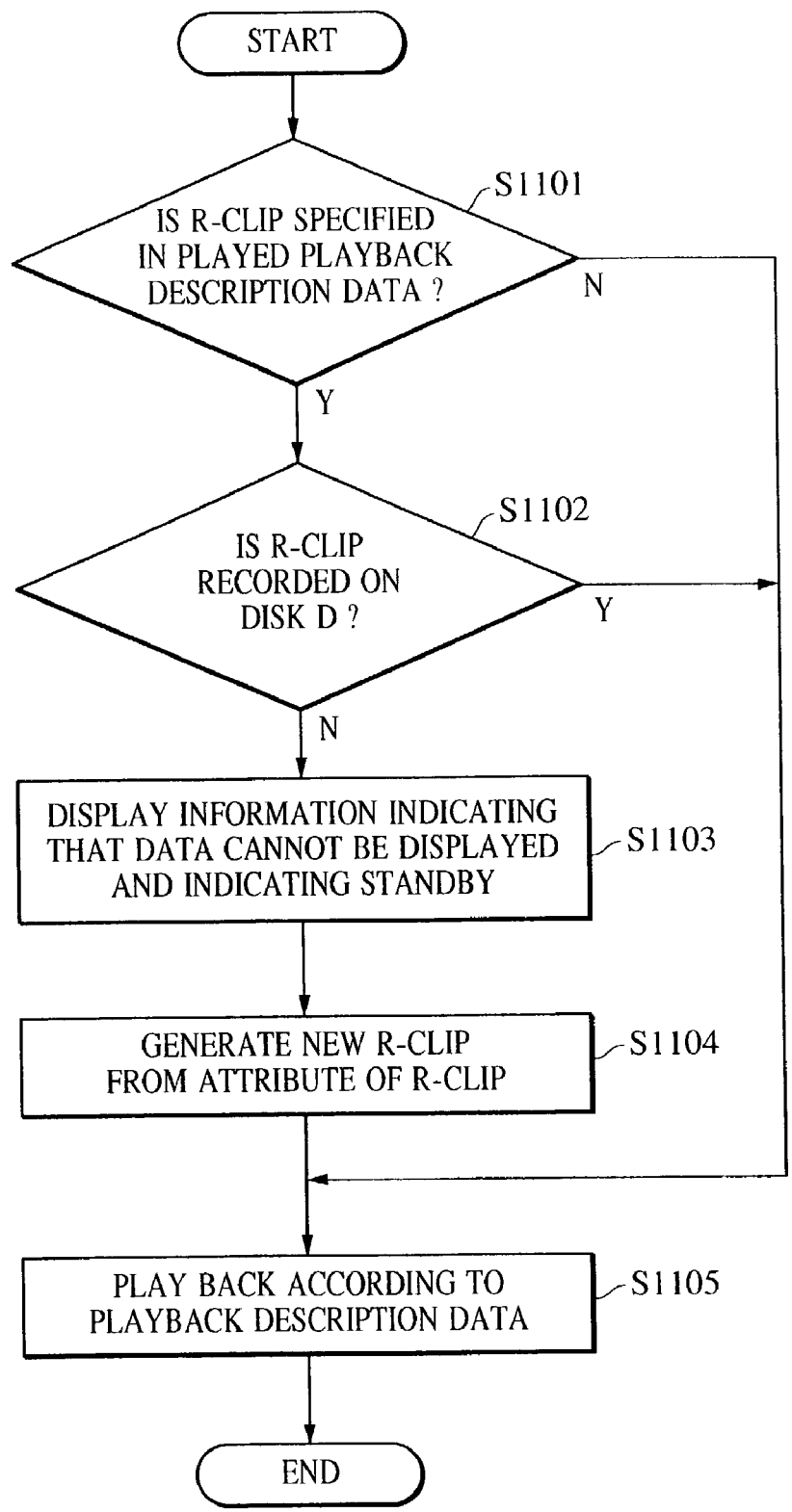
FIG. 11 is a flowchart showing a playback operation according to playback description data.

FIG. 11 is a flowchart showing a procedure in the system controller 112 wherein, in response to an instruction of the playback operation according to playback description data, if the R-clip specified by the playback description data is not recorded on the disk D.

In the above-described playback mode, when the playback description data recorded on the disk D is specified by the input device 116 to instruct to start the playback operation, the system controller 112 controls the servo control circuit 111 to play back the specified playback description data on the disk D in order to check the content. It is then determined whether or not an R-clip is specified in the played playback description data (step If an R-clip is specified, it is further determined whether or not the R-clip is recorded on the disk D (step S1102). In the first embodiment, information on the record position, file name, etc., of all the data recorded on the disk D is recorded in the data called TOC (Table Of Contents) data. The system controller 112 checks the TOC data to know if the specified R-clip is recorded on the disk D.

If the R-clip is not recorded on the disk D, the system controller 112 displays, on a display (not shown), information indicating that data cannot be played back according to the playback description data, and information indicating a standby for a while (step S1103).

Then, the system controller 112 checks attributes regarding the R-clip in the playback description data, and, based on the content thereof, generates a new R-clip using data recorded on the disk D (step S1104). As described above, in the first embodiment, the attribute of clips prior to and following the R-clip contains the playback duration of the R-clip, and the attribute of the R-clip in the playback description data contains the kind, type, subtype, and duration of the applied effect, and the file name of the R-clip. Thus, moving image data having the effect applied thereto is read, and the applied portion is rendered again to create a new R-clip.

When a new R-clip is created, the new R-clip is encoded again by the encoding/decoding circuit 106, and is passed to the memory controller 104. The memory controller 104 temporarily stores data of the new R-clip in the memory 105, and outputs it to the recording processor circuit 103 at an appropriate timing. The recording processor circuit 103 outputs the data of the new R-clip to the head driving circuit 114, and newly records it as an R-clip onto the disk D. Accordingly, when a new R-clip is generated and recorded onto the disk D, the new R-clip is used to play back data according to the playback description data (step S1105).

According to the first embodiment, therefore, when data is played back according to playback description data, even if the R-clip specified in the playback description data is not recorded on a disk, the attribute data of the R-clip, including the kind, type, subtype, and duration of the applied effect and the file name of the R-clip, and the attribute data indicating the playback duration of the R-clip are recorded in the playback description data. Thus, such attribute data can be used to generate a new R-clip.

Hence, if the R-clip is missing, the playback operation according to the playback description data can be performed without difficulty by instantaneously interrupting the playback operation.

A second embodiment of the present invention is now described.

The first embodiment provides a method in which, if the R-clip is missing, a new R-clip is created and used to continue the playback operation.

However, it may be sometimes time-consuming to create a new R-clip due to, for example, the capability of the apparatus or the effect specified in the R-clip. In this case, the playback operation according to the playback description data is interrupted, and a user must wait for a long time until a new R-clip is generated and the playback operation is resumed.

Therefore, the second embodiment provides a method capable of playing back data according to a schedule described in the playback description data, without interruption of the playback operation, if an R-clip is not recorded.

The apparatus shown in FIG. 1 is also used in the second embodiment, and the playback description data used in the second embodiment is the same as that in the first embodiment.

If the R-clip is missing on the disk D, this means that either of the following two conditions are satisfied:
(a) there is no clip having the rclipFor attribute immediately after a clip having the tailShift attribute.
(b) there is no clip having the rclipFor attribute immediately before a clip having the headShift attribute.

Figure 12:
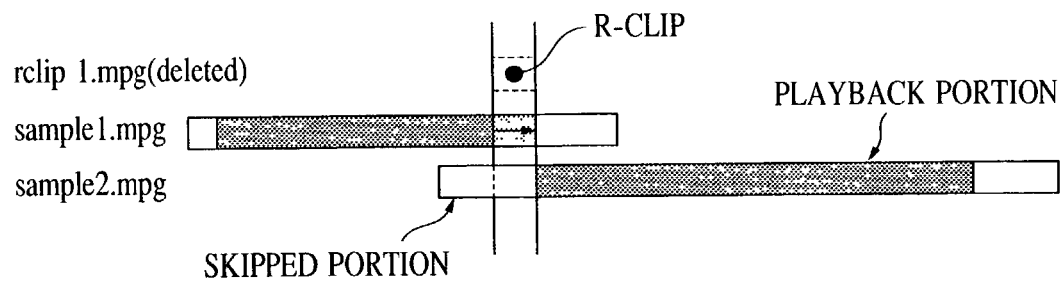
FIG. 12 is a view which describes a restoration process of playback description data.
Figure 13:
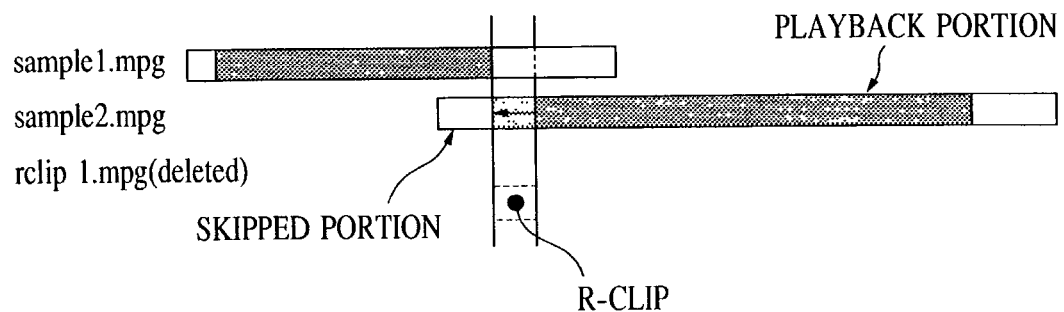
FIG. 13 is a view which describes a restoration process of playback description data.

If either or both of the conditions (a) and (b) are satisfied, the second embodiment employs the following procedures:
(1) If the condition (a) is satisfied, the cut-out point of the clip having the tailShift attribute is temporarily restored using the tailShift attribute value, so that data is played back in such a manner as to prevent a time lag of the playback time (see FIG. 12);

(2) If the condition (b) is satisfied, the cut-in point of the clip having the headShift attribute is temporarily restored using the headShift attribute value, so that data is played back in such a manner as to prevent a time lag of the playback time (see FIG. 13); and (3) If both of the conditions (a) and (b) are satisfied, either procedure (1) or (2) is taken.

Figure 14:
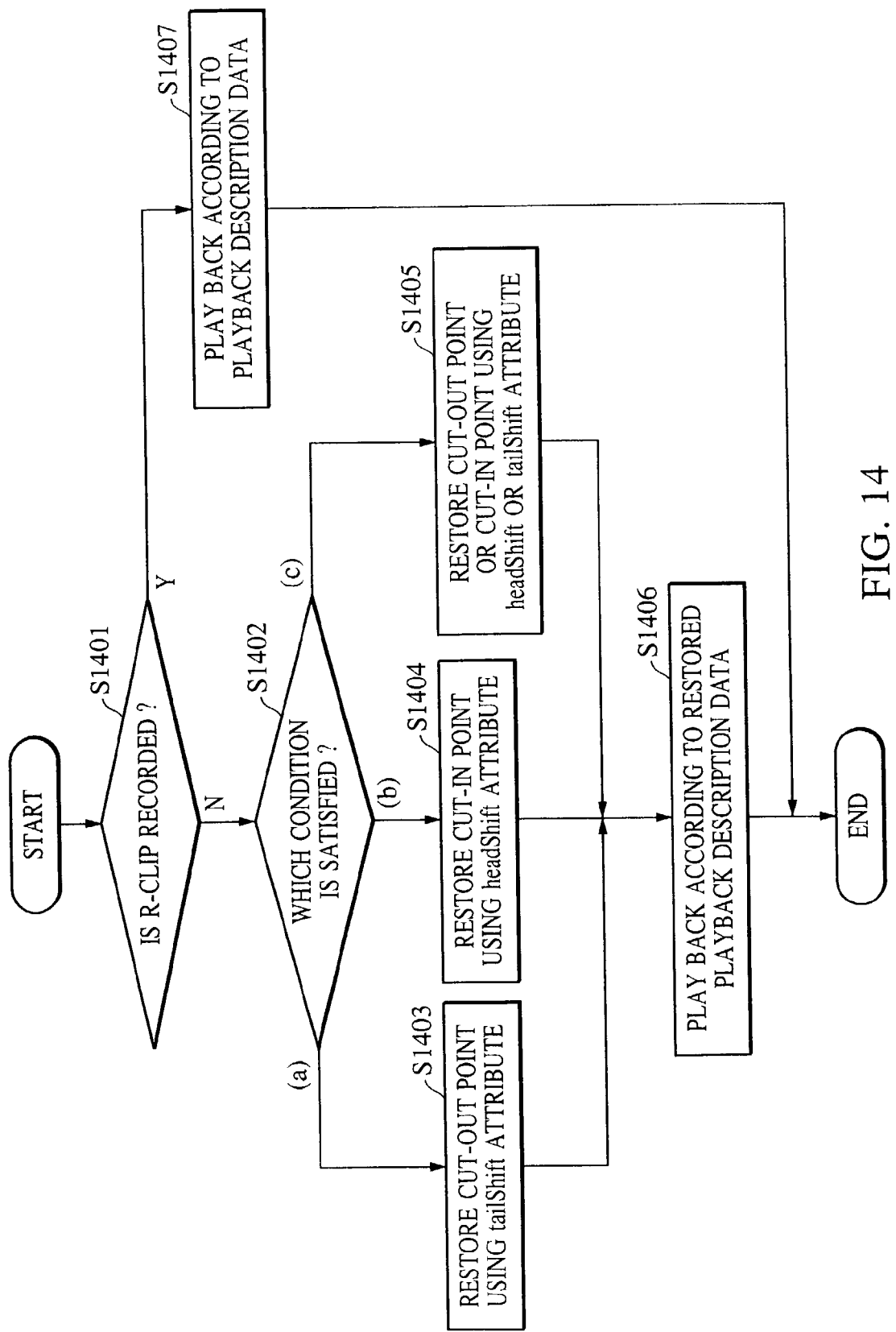
FIG. 14 is a flowchart showing a playback operation according to playback description data.
Figures 15, 16:
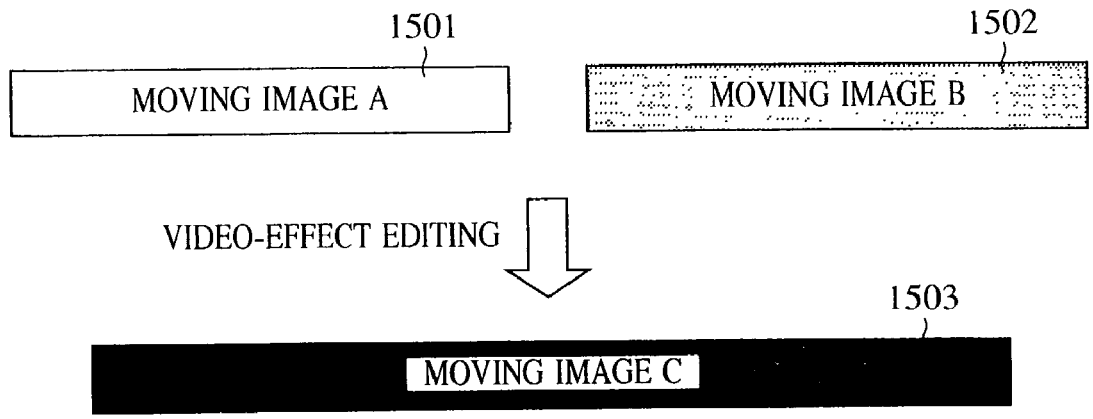
FIG. 15 is a depiction of the relationship of moving image data in an editing system.
FIG. 16 is a view showing example playback description data.

FIG. 14 is a flowchart showing a processing sequence of the system controller 112 according to the second embodiment.

In the playback mode, when playback description data is specified to instruct to start the playback operation, if an R-clip is specified in the specified playback description data, the system controller 112 determines whether or not the specified R-clip is recorded on the disk D (step S1401). If the R-clip is recorded, data is played back according to the specified playback description data (step S1407).

If the specified R-clip is not recorded on the disk D, the content of the playback description data is checked to determine which condition (a) or (b) is satisfied (step S1402).

If the condition (a) alone is satisfied, the cutout point of the clip having the tailShift attribute is restored using the tailShift attribute value (step S1403). If the condition (b) alone is satisfied, the cut-in point of the clip having the headShift attribute is restored using the headShift attribute value (step S1404). If both of the conditions (a) and (b) are satisfied, the cut-out point of the clip having the tailShift attribute is restored using the tailShift attribute value, or the cut-in point of the clip having the headShift attribute is restored using the headShift attribute value (step S1405).

Then, data is played back according to the restored playback description data.

According to the second embodiment, therefore, information about the amount of shift for the cut-in or cutout point, which is contained in the playback description data, is used to temporarily restore the cut-in or cut-out point to perform the playback operation. This allows the specified data to be played back in the specified order without delaying the timing of playback described in the playback description data although the data is not completely played back with the effect being added thereto.

For example, in the case where one piece of audio data is played back during sequential playback of a plurality of moving images, no time lag occurs in video and audio playback if the R-clip is missing.

In the second embodiment, the playback description data including restored cut-in and cut-out points is stored in an internal memory of the system controller 112, and is erased from the internal memory each time the disk is ejected. However, the present invention is not limited to this form, and the playback description data which is restored may be output to the recording processor circuit 103 and recorded onto the disk D. In this case, the playback description data before the restoration is erased from the disk D, or identification data for identifying the previous playback description data is added to the file for the restored playback description data, and is then recorded onto the disk D.

While a camcorder for recording and playing back an information signal onto and from a magneto-optical disk is used in the first and second embodiments, it is to be understood that the present invention is not limited thereto, and other structures or apparatuses for implementing a playback function using playback description data may be used.

While playback description data in a format complying with SMIL 2.0 is used in the first and second embodiments, it is to be understood that the present invention is not limited thereto, and playback description data in a data description language such as XML may also be used.

In the first and second embodiments, the playback description data or R-clip is processed by means of the circuit structure shown in FIG. 1; however, it may be processed in software using a microprocessor, a ROM, or a RAM. In this case, a memory, such as a ROM or a RAM, or an optical disk having a processing program stored thereon may also fall within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A playback apparatus comprising:

playback means for playing back a plurality of pieces of information data from a recording medium, the plurality of pieces of information data including modified data which is obtained by processing a portion of the information data;

detection means for detecting whether or not the modified data specified in playback description data is recorded on the recording medium, the playback description data specifying a playback procedure for the plurality of pieces of information data including the modified data, the playback description data having described therein a playback time for the information data including the portion of data, the playback time being modified as the modified data is played back, and the playback description data further including restoration information for restoring the original playback time for the information data for which the playback time is modified; and control means for controlling a playback operation of said playback means according to the detection result of said detection means, said control means modifying the playback description data so that the playback termination time for the information data to be played back immediately before the modified data matches the playback termination time for the modified data according to the restoration information, wherein the restoration information is (i) added as an attribute specifying the information data to be played back immediately before the modified data and (ii) is information indicating the deviation from the original playback termination time for the information data to be played back immediately before the modified data.

2. A playback apparatus comprising:

playback means for playing back a plurality of pieces of information data from a recording medium, the plurality of pieces of information data including modified data which is obtained by processing a portion of the information data detection means for detecting whether or not the modified data specified in playback description data is recorded on the recording medium, the playback description data specifying a playback procedure for the plurality of pieces of information data including the modified data, the playback description data having described therein a playback time for the information data including the portion of data, the playback time being modified as the modified data is played back, and the playback description data further including restoration information for restoring the original playback time for the information data for which the playback time is modified; and control means for controlling a playback operation of said playback means according to the detection result of said detection means, said control means modifying the playback description data so that the playback start time for the information data to be played back immediately after the modified data matches the playback start time for the modified data according to the restoration information, wherein the restoration information is (i) added as an attribute specifying the information data to be played back immediately after the modified data and (ii) is information indicating the deviation from the original playback start time for the information data to be played back immediately after the modified data.

* * * * *